Figure 1:
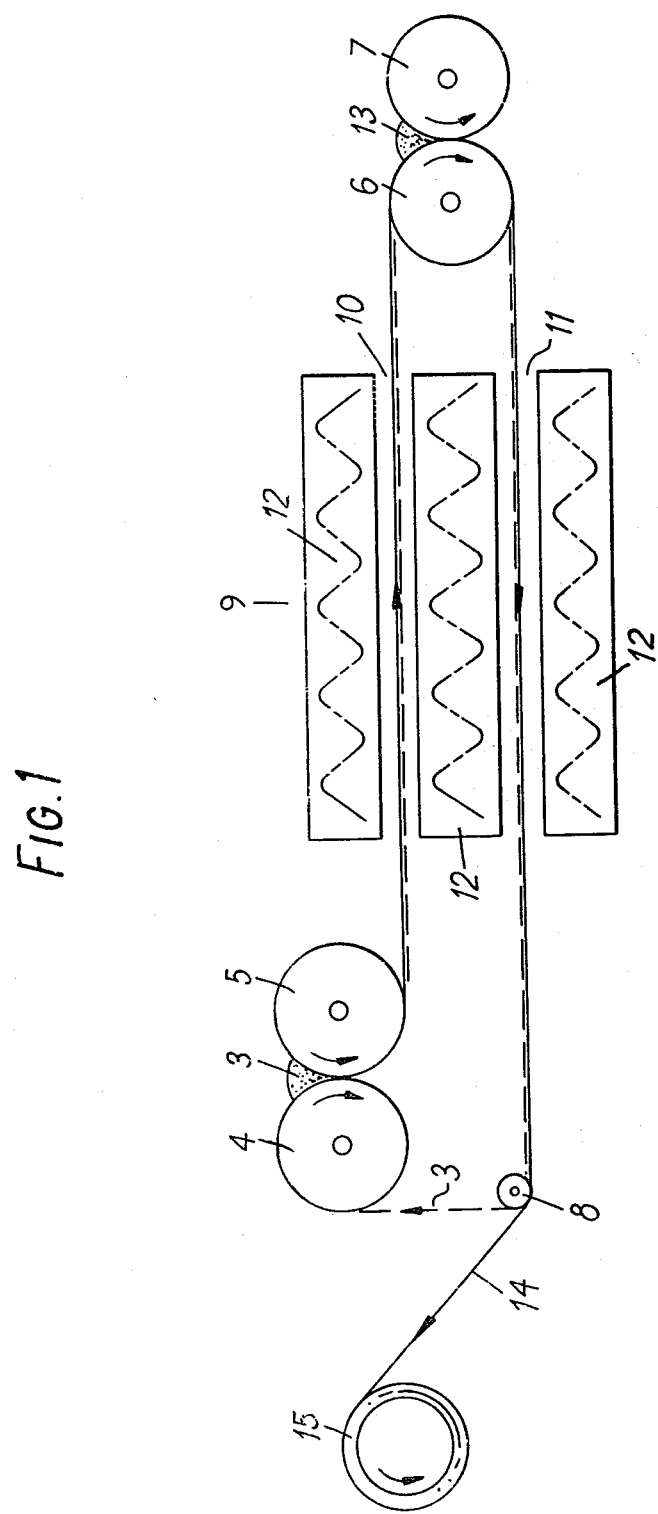

United States Patent [19]

Thornley

[11] 4,294,790
[45] Oct. 13, 1981

[54] MANUFACTURE OF SHEET MATERIAL

[75] Inventor: Harry Thornley, Rochdale, England

[73] Assignee: TBA Industrial Products Limited, Manchester, England

[21] Appl. No.: 97,887

[22] Filed: Nov. 27, 1979

Related U.S. Application Data

[63] Continuation of Ser. No. 892,512, Apr. 3, 1978, abandoned, which is a continuation-in-part of Ser. No. 892,513, Apr. 3, 1978, abandoned, which is a continuation of Ser. No. 657,477, Feb. 12, 1976, abandoned.

[30] Foreign Application Priority Data

Feb. 13, 1975 [GB] United Kingdom ............... 6160/75

[51] Int. Cl.³ .............................................. B29D 7/14
[52] U.S. Cl. ................... 264/171; 264/175; 264/236; 264/255; 264/300; 264/308
[58] Field of Search ............... 264/140–143, 264/129, 134, 175, 171, 165–166, 290, 300, 108, 122, 322, 331, 255, 236, 308

[56] References Cited

U.S. PATENT DOCUMENTS 1,347,918  7/1920  Stafford ............................... 264/171
1,877,651  9/1932  Eisenhardt .......................... 264/175
2,120,935  6/1938  Groff ................................... 264/300
2,123,180  7/1938  Corbin, Jr. et al. ................. 264/171
2,309,342  1/1943  Dent et al. .......................... 264/108
2,530,906  11/1950 Palumbo .............................. 264/175
2,834,991  5/1958  Hardman ............................ 264/141
3,158,669  11/1964 Greenlie et al. .................... 264/257
3,694,304  9/1972  Palumbo .............................. 264/175

FOREIGN PATENT DOCUMENTS 587891   5/1947  United Kingdom .
1260513  1/1972  United Kingdom .

Primary Examiner—Jeffery R. Thurlow
Attorney, Agent, or Firm—Diller, Ramik & Wight

[57] ABSTRACT

A process for the production of fibre-reinforced sheet material in indefinite lengths comprises a first rolling step wherein a curable dough of thermoplastic polymer containing reinforcing fibres is rolled onto one face of a band to form a first coating which is dried prior to a second rolling step wherein further dough is rolled onto the first coating to form with the first coating a single layer; said single layer is dried, stripped from the band and cured. The dough includes a special solvent system comprising a solvent for the polymer and a non-solvent liquid, to give the dough a "release" characteristic.

8 Claims, 2 Drawing Figures

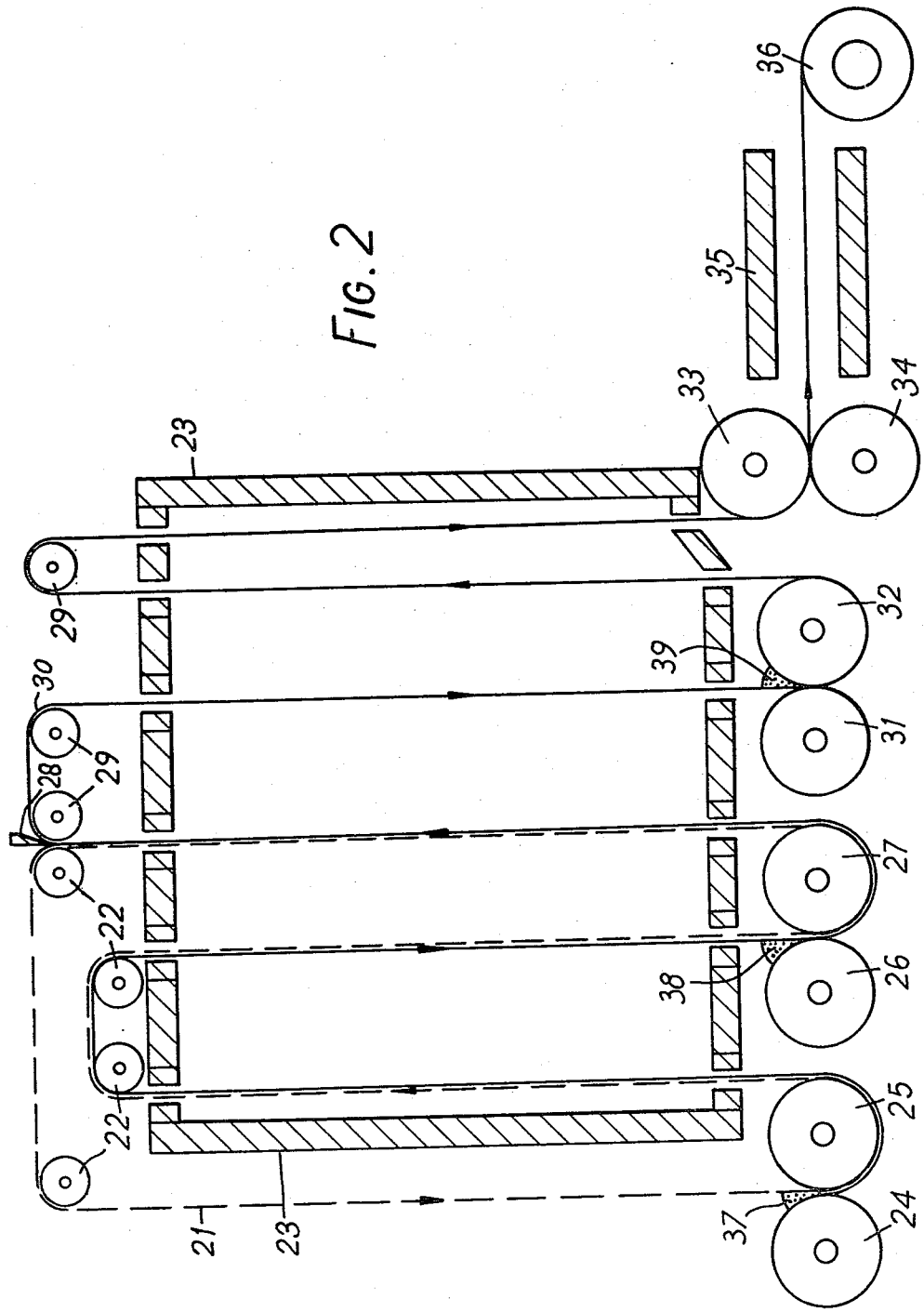

MANUFACTURE OF SHEET MATERIAL

This application is a continuation of Ser. No. 892,512, filed Apr. 3, 1978, now abandoned, which is a continuation-in-part of Ser. No. 892,513, filed Apr. 3, 1978 and now abandoned, which in turn is a continuation of application Ser. No. 657,477 filed Feb. 12, 1976, now abandoned.

The present invention relates to the manufacture of sheet materials comprised of fibre-reinforced polymers including elastomers and synthetic resins, for example, natural and/or synthetic rubber, PVC and the like which are thermoplastic in the uncured or unvulcanised state. Such materials are described in this specification as "thermoplastic polymers" and it should be noted that the term "polymers" includes copolymers and/or blends thereof.

One such sheet material which is typical of the broad class to which the present invention is applicable is asbestos-reinforced rubber sheet material of the kind commonly used for example in gaskets. A process known as "it" calendering has been used to make this product ever since its introduction by R. Klinger in 1896.

The "it" calender consists of a large, heated steel cylinder, up to 2 meters in diameter and about the same in width. A cooled steel roller usually less than 1 meter in diameter runs against the cylinder, defining a nip which is adjustable. The "it" process consists in calendering a curable dough of thermoplastic polymer containing reinforcing fibres onto the surface of the steel cylinder as a succession of very thin increments, typically 0.015 to 0.025 m.m. thick, using nip pressures of the order of 100 kg per cm. of cylinder width.

The successive increments are not just formed, but also dried, consolidated into a single layer and then cured, all on the same heated cylinder, the temperature is then of which is held substantially constant throughout the operation of the machine at the curing temperature of the polymer.

The above process is well known to those experienced in the art and it can be used to make sheets of material about 6 meters long and 2 meters wide, the exact size being determined by the diameter and width of the heated cylinder. The size of sheeting made by the basic "it" process is therefore necessarily limited by the size of the heated cylinder used. It is also limited as to the maximum thickness of sheet which can be built up due to insulating properties of the already formed, dried, consolidated and partly cured layers adjacent the cylinder. Not only is it subject to the above limitations, but also it suffers from the inherent and fundamental limitation that sheet formation, drying, consolidation and curing are all carried out on the same cylinder and that therefore there is a significant degree of interaction/overlap between them.

The length of the sheet can be very significantly increased by adopting the techniques described in the specifications of the U.K. Pat. Nos. 587,891 and 1,260,513 in which one surface of an endless steel band is substituted for the large heated cylinder of an "it" calender. However, this improved process is still limited by the length of the band as to the length of sheet which can be produced. Of course, further limitations lie in the fact that the sheet is still built up as a succession of very thin layers and that drying consolidation and curing are still integral steps in the process, exactly as before.

According to the present invention a process for the production of sheet material in indefinite lengths comprises a first rolling step, wherein a curable dough of thermoplastic polymer containing reinforcing fibre and a special solvent system is rolled onto one face of a band to form a first coating, drying said coating prior to a second rolling step, wherein further dough is rolled onto it to form with the first coating a single layer, drying said single layer, stripping it from the band and curing it. The special solvent system comprises a mixture of a solvent for the thermoplastic polymer together with a non-solvent liquid, the latter imparting to the dough a "release" characteristic tending to inhibit the dough from sticking to the rollers and/or the band. In this connection, we prefer that the surface finish of the rollers be different from the surface finish of the band so that the dough is formed into a sheet on the band and not on the rollers. This is particularly important when the rolling steps are carried out cold, which is preferred. When a steel band is used, slight roughness in the surface finish of the band relative to that of the rollers is sufficient to ensure that the sheet is formed on the band. However, the sheet obviously must not be so firmly adhered to the band that subsequent stripping becomes too difficult or even impossible.

Preferably the process includes the step of consolidating the single layer prior to curing it.

In the context of this specification "curing" has a special significance because it is used to comprehend not only the curing and/or vulcanising treatments hitherto employed for asbestos-rubber compositions, but also the gelling of PVC-based compositions. In fact, the gelling of such compositions is analagous to curing because on heating to gell the composition, polymer chain extension occurs, rendering the product less soluble, or indeed insoluble in the solvent used.

The band may be of steel or of a fabric, such as glass, coated with a solvent-resistant material. It is preferably endless and, after stripping the single layer from its surface, it is returned to the first rolling step of the process. Optionally, further rolling steps may be used to apply further dough to the single layer, thereby building up the latter to a greater thickness prior to drying and stripping it from the band. Optionally after the single layer has been stripped from the band a further one or more coatings may be applied to it, thus building it up to an even greater thickness after it has left the band, but before the consolidating and curing steps. The separate drying steps are particularly important because it is necessary to dry without the same time causing blistering of the coatings and without causing significant pre-cure. The latter is partial cross-linking, which tends to drastically alter the rheology of the dough. About 5% of the maximum possible cross-linking is the most that can be tolerated; the present invention enables the drying steps to be carried out at 80°–100° C. and it is thereby possible to limit pre-cure to less than 2%, thereby avoiding unwanted modification of the dough rheology before the sheet is properly formed and consolidated. It will be appreciated that because the "it" process requires each incremental layer to be dried in turn in a single revolution of the cylinder, it is essential to use a higher cylinder temperature than is necessary for drying alone. This is compounded by the fact that the innermost layers tend to insulate the outer most layers from the heated cylinder. As explained earlier, the "it" process uses a cylinder maintained at the curing temperature. This inevitably causes the inner layers to cure to a higher degree than the outer layers. By contrast, the present invention enables the drying time and temperature to be chosen so that minimal pre-cure occurs. For example, up to ten minutes in a hot air oven at 90° C. might be desirable to completely dry without pre-cure a typical 0.5 mm coating containing toluene/water as the solvent/non-solvent mixture. Clearly this would be impracticable using the "it" process, or any variant of it.

Preferably the rolling steps are carried out cold, that is to say, using unheated rollers. This nip pressure applied is appreciably lower than in the "it" process, thereby allowing the formation of a much thicker coating, typically 0.5 mm thick, in a single passage through the nip. By "appreciably lower" in the present context we mean of the order of one-tenth of the nip pressure used in the typical "it" calender described earlier. A significant feature of the invention lies in this fact that a relatively thick layer can readily be formed at each rolling step and that the drying and the curing (or vulcanizing) steps are both independent of the temperature of the rollers and individually controllable, by virtue of being carried out quite separately. The process is also a continuous one, in that the sheet, once stripped from the band, and, if desired, further coated to increase the thickness, then dried, consolidated and cured, can be reeled or cut into sheets of any desired size, as required. Compositions useable in the process of the present invention include conventional asbestos-rubber formulations, as used in "it" calendering, in combination with the solvent system referred to earlier. When using compositions containing PVC polymer(s), it is often found advantageous to include an elastomer, typically in an amount in the range of from 5 to 10% by volume of the total composition, in order to improve the processability, particularly during the rolling steps. The solvent system referred to earlier is also included in such formulations to provide the desired "release" characteristic.

Because drying and curing are now separate, discrete steps in the process, the curing step can be carried out at a substantially higher temperature, for example, in the range 140°–160° C., enabling the use of a wider range of curing systems. This in turn enables the degree of cure of the sheet to be taken to a more advanced stage, as well as ensuring that substantially the whole thickness of the sheet is at this degree of cure. In the "it" process, of course, the degree of cure tends to vary from the inside layers (referring to those layers adjacent the hot cylinder) to the outside layers, which are cured to a much lesser extent, being remote from the source of heat and also partly insulated from it by the inside layers. In particular, the present invention enables the use of curing systems which are not activated below 120° C., which is well above the drying temperature, thus further separating drying and curing.

The process according to the invention includes the further steps of compounding a dough from polymer, fibre, fillers, accelerators, and vulcanizing (or curing) agent, together with a solvent comprising a solvent for the polymer and a non-solvent liquid, followed by extruding/pelletizing the dough prior to feeding it at the first and second rolling steps of the process.

The invention also includes sheet material made by a process according to the invention and also includes gaskets and other articles made from such sheet material.

In order that the invention be better understood two examples of quite different formulations which can be used in a process according to the invention will now be given.

EXAMPLE 1

A conventional asbestos-rubber gasket composition was made from the following ingredients, all percentages being by weight:

| Natural rubber | 5.34 |
| --- | --- |
| Nitrile rubber | 1.68 |
| Asbestos (4's grade) | 36 |
| Barytes | 6.96 |
| Whiting (mineral calcium carbonate) | 8.88 |
| Zinc Oxide | 0.24 |
| Tetramethythiuram disulphide | 0.27 |
| Sulphur | 0.21 |
| Stearic Acid | 0.024 |
| Sodium carbonate | 0.42 |
| Toluene | 32 |
| Water | 8 |
| | 100.000% |

The solvent/non-solvent ratio was 4:1 in this case.

The ingredients were compounded into a dough by firstly forming a rubber dough from the two rubbers and the toluene. This rubber dough was then compounded with the remaining ingredients, except for the sodium carbonate and water which were added as a solution towards the end of the mixing cycle.

The resultant dough was extruded and pelletised prior to further processing, which will be described later.

EXAMPLE 2

A PVC-based sheet formulation was made up from the following all percentages being by weight:

| PVC polymer, paste grade (corvic P65/60) | 11.75 |
| --- | --- |
| PVC powder (Breon S110/10) | 3.82 |
| PVC powder (Vinnol VE40/1) | 3.82 |
| PVC latex (Breon 4001) | 5.87 |
| Nitrile rubber | 2.59 |
| Talc | 3.82 |
| Dicyandiamide | 0.80 |
| Lamp black | 0.02 |
| Asbestos fibre (4's grade) | 31.16 |
| Sodium Carbonate | 0.26 |
| Toluene | 33.50 |
| Water | 2.59 |
| Total | 100.00% |

The ratio of solvent/non-solvent (including the latex contribution) is 6:1.

Compounding was carried out by making a rubber dough from the rubber and toluene, followed by mixing the rubber dough with the PVC powders, the talc, the dicyandiamide and lamp black in a twin sigma blade mixer to form a smooth dough, which was then mixed with the asbestos fibre and the PVC latex to form a fibre/polymer dough. Towards the end of this latter mixing cycle, the sodium carbonate was added in solution in the water in order to impart to the fibre/polymer dough the desired release properties, prior to extruding and pelletizing it.

The dough prepared as described in Example 1 was processed into sheet form by means of the apparatus shown in FIG. 1, which is a diagrammatic side view of the apparatus of the invention. FIG. 1 shows an endless steel band 3 mounted for passage between a first pair of rollers, 4 and 5, a second pair of rollers, 6 and 7, and a guide roller 8. A drying oven 9 has two heating zones 10 and 11 defined between three banks of heating elements 12 and the upper and lower runs of the band pass through the zones 10 and 11 respectively.

Pelletized dough 13 was fed to the nips defined between the two pairs of rollers, the sheet material 14 produced being stripped from the band as the band passed around the guide roller 8 back towards the first pair of rollers 4 and 5, prior to reeling it at 15. To enhance the effect of the solvent system in conferring "release" properties on the dough, the surface finish/smoothness of the rollers 4,5,6 and 7 was made appreciably better than that of the working surface of the band.

The sheet material produced was consolidated by passing it through a curing oven and, after cooling, winding it into a roll.

In the case of the conventional asbestos rubber gasket composition described above, the properties of the sheet material produced were compared with those of a sheet material prepared from the same formulation by means of a conventional "it" calender.

The dough of Example 2 was similarly processed, but the final curing treatment was, of course, a heat treatment effective to gell the composition.

TABLE 1

| | new Process. Example 1 Material) | "it" Process. |
|---|---|---|
| Thickness (mm) | 1.36 | 1.59 |
| Density (Kg/m$^3$) × 10$^3$ | 1.93 | 2.1 |
| Compression (%) | 6.7 | 8.7 |
| Recovery (%) | 24.3 | 30.6 |
| Tensile Strength W (MN/m$^2$) A | 14.6 | 25.9 |
| Stress Retention | 6.2 | 8.6 |
| Value (MN/m$^2$) | 17.8 | 9.4 |

Although the tensile strength of the material was lower than that of the "it" material, the compression characteristics were very similar, and the stress retention value was significantly higher. Since it was possible to produce an acceptable material using a standard formulation, it would seem likely that the physical properties could be improved by reformulation.

FIG. 2 of the drawings shows a diagrammatic side view of a modified form of apparatus which features three pairs of rollers at which dough can be introduced. In FIG. 2, an endless band 21 passes through a nip between a pair of rollers 24, 25 and then through a drying over 23, around a guide roller 22 and back through the oven to a second nip, defined between a pair of rollers 26,27. The band then passes through the oven 23, again, around a guide roller 22 and back to the first nip.

The direction of travel of the band, both inside the oven and outside it are indicated by arrows. A doctor blade 28 is provided so that before the band returns outside the oven to the first nip between rollers 24, 25 and the layer of material on it is stripped off, two guide rollers 29 being provided to enable the stripped material 30 to return through the oven to a third nip defined between a pair of rollers 31, 32. From the third nip the material passes through the oven, around a further guide roller 29 and back through the oven. After this second passage through the oven the material is forwarded to a fourth nip defined between a pair of rollers, 33, 34 which serve to consolidate the material prior to treatment in a curing oven 35 and collection at a reeling station 36.

In the operation of FIG. 2 apparatus, dough 37 is fed to the nip between the first pair of rollers 24, 25 to form a layer of material on the band 21. When this layer has been dried by two passages through the oven, it arrives at the nip between the second pair of rollers 26, 27 and further dough 38 is rolled onto it to form a single layer which, after a single passage through the oven is stripped from the band by the doctor blade 28 and returned through the oven to the nip between the third pair of rollers 31, 32 at this nip, further dough 39 is rolled onto the material to form with the already-formed layer, a single layer which, after two passages through the drying oven 23, is consolidated by the rollers 33, 34 subjected to curing (or vulcanizing) temperature in the oven 35 and then reeled.

Once the apparatus has been put into operation, the whole of the layer-forming section can be easily supervised by a single operative, as the dough feeding process lends itself to substantially fully automatic control, the required quantities of pelletized dough being metered into each nip on a continuous basis.

I claim:
1. A process for the production of fiber-reinforced sheet material of indefinite length, which comprises the steps of:
   (a) providing an uncured, heat-curable dough compounded from thermoplastic polymer, reinforcing fiber and a solvent system which comprises a liquid solvent for the polymer and a liquid which is a non-solvent for the polymer, the non-solvent imparting release characteristics to the dough;
   (b) rolling the dough of step (a) onto one face of a metal band, at ambient temperature and under a rolling pressure in the order of 10 kg per cm sufficient to form an uncured first coating of dough having a thickness in the order of 0.5 mm and which is wholly exposed on that side face thereof remote from said one face of the band;
   (c) heating said first coating while exposed as in step (b) under conditions of time and temperature sufficient to dry said first coating but insufficient significantly to cure same, whereby the flow characteristics of the first coating are not drastically altered;
   (d) rolling the dough of step (a) onto said first coating on said one face of the band, at ambient temperature and under a rolling pressure sufficient to form, with said first coating, a single uncured layer of thickness increased with respect to that of said first coating and which is wholly exposed on that side face thereof remote from said one face of the band;
   (e) heating said single layer while exposed as in step (d) under conditions of time and temperature sufficient to dry said single layer but insufficient significantly to cure same, whereby the flow characteristics of the single layer are not drastically altered;
   (f) stripping said single layer from said band; and
   (g) heating said stripped layer under conditions of time and temperature sufficient to cure the dough and drastically alter the flow characteristics thereof.

2. The process as defined in claim 1 wherein the dough of step (a) contains a thermoplastic polymer capable of cross-linking, steps (c) and (e) being ineffective to cure the dough to a degree of cross-linking which is more than about 5%.

3. The process as defined in claim 1 wherein the dough of step (a) contains a thermoplastic polymer capable of cross-linking, steps (c) and (e) being ineffective to cure the dough to a degree of cross-linking which is more than about 2%.

4. The process of claim 3 wherein said thermoplastic material is a mixture of rubbers.

5. The process of claim 2 wherein said thermoplastic material is a mixture of rubbers.

6. The process of claim 1 wherein the thermoplastic material is polyvinyl chloride polymer, steps (c) and (e) being ineffective to gell the dough in significant degree.

7. The process of claim 1 wherein curing of said dough is not activated below 120° C., the heating of steps (c) and (e) being effected at temperatures below 120° C. and the heating of step (g) being effected at a temperature greater than 120° C.

8. The process of claim 2 wherein curing of said dough is not activated below 120° C., the heating of steps (c) and (e) being effected at temperatures below 120° C. and the heating of step (g) being effected at a temperature greater than 120° C.

* * * * *